(12) United States Patent
Lu et al.

(10) Patent No.: US 7,590,228 B2
(45) Date of Patent: Sep. 15, 2009

(54) GENERAL CHARGING METHOD

(75) Inventors: Zhijian Lu, Shenzhen (CN); Xin Zhang, Shenzhen (CN); Xiaozheng Guo, Shenzhen (CN); Qingchen Chu, Shenzhen (CN); Youkun Chen, Shenzhen (CN)

(73) Assignee: Huawei Technologies Co., Ltd., Bantain (CN)

( * ) Notice: Subject to any disclaimer, the term of this patent is extended or adjusted under 35 U.S.C. 154(b) by 0 days.

(21) Appl. No.: 11/979,772

(22) Filed: Nov. 8, 2007

(65) Prior Publication Data

US 2008/0065571 A1 Mar. 13, 2008

Related U.S. Application Data

(63) Continuation of application No. 10/558,620, filed as application No. PCT/CN2003/001161 on Dec. 31, 2003, now Pat. No. 7,313,230.

(30) Foreign Application Priority Data

May 26, 2003 (CN) ................................. 03138392

(51) Int. Cl.
*H04M 15/00* (2006.01)
(52) U.S. Cl. ............................. 379/114.01; 379/114.03; 379/114.06; 379/114.09; 379/114.2; 705/34
(58) Field of Classification Search .................. 379/111, 379/114.01, 114.05, 114.06, 114.09, 114.1, 379/114.12, 121.02, 121.04, 127.04, 127.05, 379/128, 131, 114.03; 705/34, 40
See application file for complete search history.

(56) References Cited

U.S. PATENT DOCUMENTS

| 6,205,211 | B1* | 3/2001 | Thomas et al. | 379/114.06 |
| 6,249,573 | B1* | 6/2001 | Hudson | 379/114.2 |
| 6,338,046 | B1 | 1/2002 | Saari et al. | |
| 6,487,283 | B2* | 11/2002 | Thomas et al. | 379/112.01 |
| 7,289,787 | B2* | 10/2007 | Bricelj et al. | 455/406 |
| 2001/0001000 | A1* | 5/2001 | Thomas et al. | 370/200 |
| 2003/0048887 | A1* | 3/2003 | Alcott et al. | 379/114.01 |
| 2005/0069112 | A1* | 3/2005 | Hlasny | 379/126 |

FOREIGN PATENT DOCUMENTS

| CN | 1355647 A | 6/2002 |
| WO | WO 00/77748 | 12/2000 |
| WO | WO 03/042885 A | 5/2003 |

* cited by examiner

*Primary Examiner*—Binh K Tieu
(74) *Attorney, Agent, or Firm*—McDermott Will & Emery LLP

(57) ABSTRACT

A general charging method includes establishing a charging strategy and performing the charging according to the charging strategy. The charging strategy includes at least one priority each of which includes at least one time period and each of the time periods is provided at least one rate segment in each of which there is at least one rate. Performing the charging includes: matching with a corresponding charging strategy upon the time a subscriber uses a service and/or the subscriber's current resource, and determining a charging mode; searching for a corresponding priority; performing the charging according to the charging mode. With such a structure of general charging strategy, the method can satisfy various charging demands and provide generality and adequate expansibility. Also, the method enables subscribers to configure different charging methods as necessary.

14 Claims, 2 Drawing Sheets

GENERAL CHARGING METHOD

CROSS REFERENCE OF RELATED APPLICATIONS

This application is a continuation application of U.S. patent application Ser. No. 10/558,620 filed on Nov. 28, 2005 now U.S. Pat. No. 7,313,230 and entitled "General Charging Method" which is a U.S. national phase patent application based on the international application No. PCT/CN2003/001161 filed on Dec. 31, 2003 and entitled "General Charging Method", claiming the priority of the Chinese patent application No. 03138392.0 filed on May 26, 2003 and entitled "General Charging Method".

FIELD OF THE INVENTION

The present invention relates to the communication field, particularly to a charging method in the communication field.

BACKGROUND OF THE INVENTION

In the highly developed information society, communication operators provide subscribers with various information services, such as telephone service, Internet-access service, short-message service, as well as different charging methods.

Typical charging methods include but not limited to the following:

1. Duration-based charging: i.e. the charging is based upon the time that the subscriber spends in using the service, such as the telephone service. One charging method is that during the use of the service, the charge per unit time is identical, and the charge of the session service at a time is calculated according to the duration. Another charging method is that the entire use of the service is charged according to time segments, and the charge per unit time for each of the time segments is different, for example, the charging rate is 0.2 yuan/minute for the first minutes and 0.3 yuan/minute after 3 minutes. Then the charging is performed according to the relationships between the duration and the time segments and using the different charges per unit time. For example, the charging method is 0.2 yuan/minute for 0-3 minutes and 0.1 yuan/minute after 3 minutes. If the duration is 15 minutes, then the charge is $3*0.2+12*0.1=1.8$ yuan.

2. Traffic-based charging: it is mainly used for the Internet-access service, and the charging is based upon the quantity of data transferred during the service used by the subscriber. One charging method is that during the use of the service, the charge per unit traffic is identical, and the charge of the service is calculated according to the total traffic. Another charging method is based upon traffic segments for the use of the service, and the charge per unit traffic is different in each of the traffic segments, for example, the charge rate is 0.2 yuan/KB for the first 1 MB and 0.1 yuan/KB after 1 MB, and then the total charge is calculated according to the relationships between the total traffic used by the subscriber and the traffic segments and using the different charges per unit traffic. For example, the charging rate is based on 0.2 yuan/KB for 0-1 MB and 0.1 yuan/KB after 1 MB. If 1.5 MB is used, then the charge is $1024*0.2+0.5*1024*0.1=256$ yuan.

3. Number-of-times-based charging: the short message service and the call transfer service are mostly used at present, i.e. the charge of the service used each time is determined according to the number of times that service is used.

4. Accumulative charging: the charging is based upon the total quantity of the accumulative duration, traffic or number of times for a certain service used by the subscriber, the unit charge before the total quantity reaches the prescribed accumulative quantity is different from that after the total quantity reaches the prescribed accumulative quantity. For example, in the Internet-access service, the charging rate is 1.0 yuan/hour within a 100-hour accumulative Internet-access duration and 0.5 yuan/hour after a 100-hour accumulative Internet-access duration. For example, if the accumulative Internet-access duration is 70 hours, and the duration of the certain Internet-access is 15 hours, then the charge is $15*1.0=15$ yuan due to 70+15<100.

Though the above charging methods meet various charging demands to some extent, they have the following drawbacks:

(1) Lack of generality: one charging method is often devoted to one service. When a new service is provided, it is often impossible to meet the charging demands in the existing charging system, and therefore the existing charging method has to be modified or new charging software has to be developed. For example, if the function of "accumulative charging" is to be added to a "duration-based charging" system, and a reward of 10-hour free Internet-access duration is for a 100-hour accumulative Internet-access duration, the existing charging method has to be modified.

(2) Complexity and disaccord of configuration methods: different charging methods have different configuration methods. It is required for the subscribers to consider how to convert the charging method into a data structure that can be processed by the software, whereas it is required for the developers to consider how to design a software to meet different charging demands, which is one of the major reasons why it is necessary to modify the existing software or develop a new software in a new charging method.

(3) Inflexibility of rate configuration methods: for example, a charging demand is that 1.0 yuan/hour is for the Internet-access, and a reward of 10-hour free duration is for accumulative 100-hour Internet-access duration. If the accumulative Internet-access duration of the subscriber is 98 hours and the current Internet-access duration is 3 hours, then there are two applicable charging methods:

One method is that the charge of the current 3-hour Internet-access is $3*1.0=3$ yuan, and the reward of 10-hour free duration will be used during the next Internet-access until the free hours are used up, which is referred to as "later use of reward".

The other method is that for the current 3-hour Internet-access, the charge is $2*1.0=2$ yuan for the 2 hours which is counted within the accumulative 100 hours, and the rest 1 hour which is counted beyond the accumulative 100 hours takes the free duration of the reward and thus is not charged. Therefore, the charge is $2*1.0+1*0=2.0$ yuan for the current Internet-access, while the remaining free Internet-access duration is recorded as 9 hours for later use, which is referred to as "instant use of reward.

However, if either method is determined, the charging method cannot be changed to the other; otherwise, the software has to be modified.

Furthermore, the existing charging methods are often devoted to some services, i.e. the charging method for one service is quite different from that for another. Therefore, if the operator provides a new service, a new charging method has to be customized, which not only increases the cost for the operator but also results in the disorder of the charging software in the market. Therefore, in order to meet the demands of the operators to develop services, it is rather advantageous for the operators and the subscribers to provide a uniform configuration and calculation method for all the charging methods and to further achieve a general charging method in a uniform structure.

SUMMARY OF THE INVENTION

One embodiment of the present invention provides a general charging method, which can meet all charging demands and provide adequate expansibility.

The general charging method includes establishing a charging strategy and performing the charging according to the charging strategy.

The charging strategy includes at least one priority each of which includes at least one time period, and each of the time periods is provided with at least one rate segment in each of which there is at least one rate; and performing the charging includes:

matching with a corresponding charging strategy upon the time a subscriber uses a service and/or the subscriber's current resource, and determining a charging mode;

searching for a corresponding priority; and performing the charging according to the charging mode.

With such a structure of general charging strategy, the method provided by the embodiments of the present invention can satisfy various charging demands and provide generality and adequate expansibility. Meanwhile, the configuration pattern in the general charging method is uniform, i.e. there is a similar configuration pattern in the same structure regardless of various charging demands. Also, the method is flexible and enables subscribers to configure different charging methods as necessary.

DETAILED DESCRIPTION OF THE EMBODIMENTS

Figure 1:
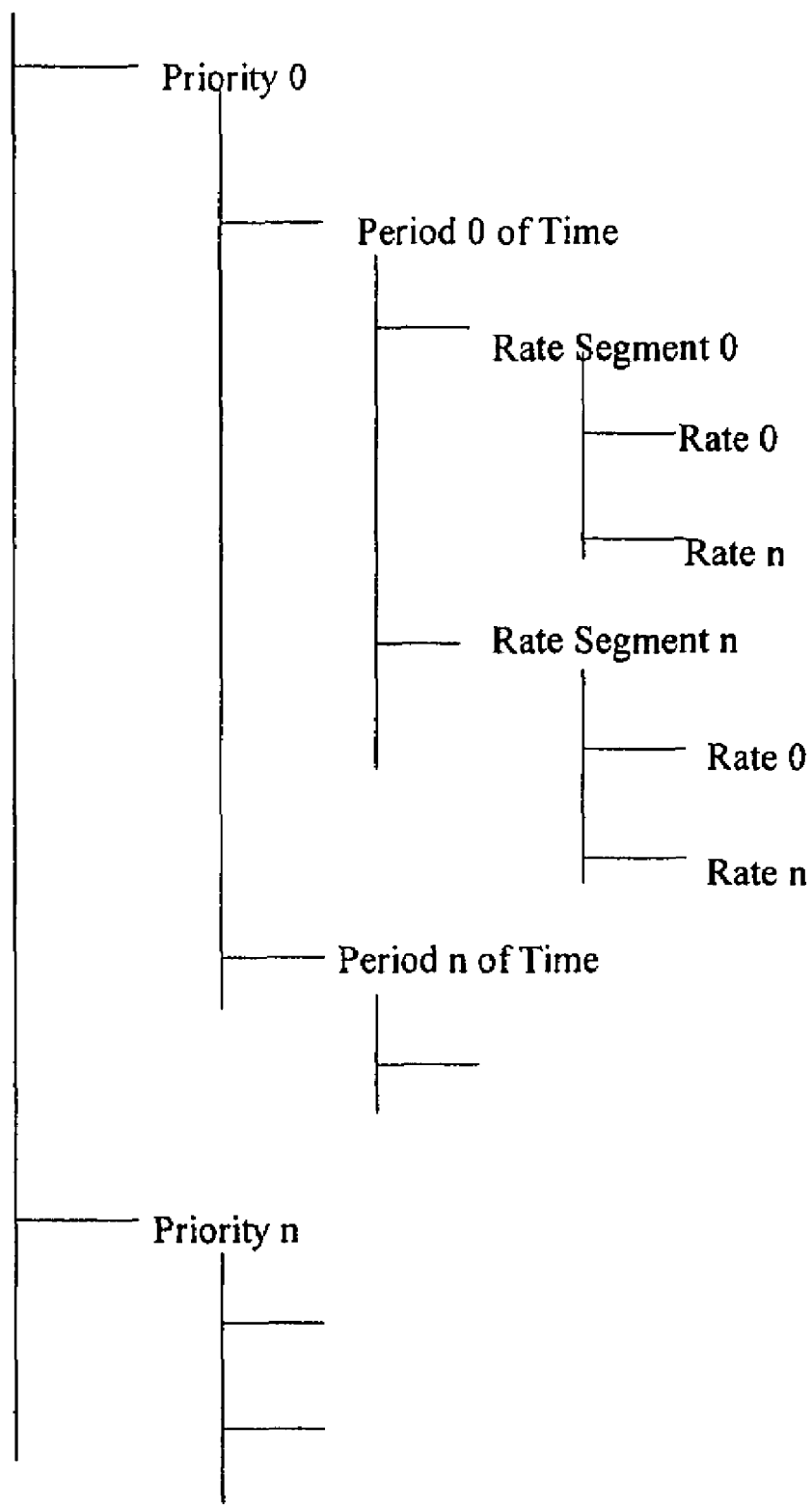
FIG. 1 is a schematic diagram of the charging strategy the charging method according to the embodiment of the present invention.

The present invention is further detailed as follows with reference to the embodiments and accompanied drawings.

First the following concepts are clearly defined for a better understanding of the charging method according to the embodiment of the present invention.

Resource: it refers to any entity that can be possessed and used by the subscriber during the charging, such as currency, free duration, accumulative Internet-access duration, accumulative charge, total disk space, available disk space or the like.

Rate: IT REFERS TO A SPECIFIC WAY IN WHICH A CERTAIN RESOURCE IS AFFECTED. For example, 1.0-yuan currency spent per hour refers to the resource of 1.0-yuan "currency" spent per hour; 0.1-yuan currency spent each time refers to the resource of 0.1-yuan "currency" spent each time; 1-hour increment of the accumulative Internet-access duration per hour refers to 1-hour increment of the resource of "accumulative Internet-access duration" per hour; and 1-hour free duration spent per hour refers to the resource of 1-hour "free duration" spent per hour.

Rate segment: IT REFERS TO A SEGMENTED INTERVAL OF RATE. As described above, "the charging rate is 0.2 yuan/minute for the first 3 minutes and 0.1 yuan/minute after 3 minutes", wherein "0-3 minutes" is called a rate segment, and "3 minutes above" is also called a rate segment; "the charging rate is 1.0 yuan/hour within 100-hour accumulative Internet-access duration and 0.5 yuan/hour after 100-hour accumulative Internet-access duration", wherein "0-100 hours" is called a rate segment, and "100 hours above" is also called a rate segment, and so on.

Rate segments can be divided into resource-accumulative segmentation and usage-quantity segmentation. The resource-accumulative segmentation refers to segmentation of a certain resource, such as "accumulative Internet-access duration within 100 hours" as discussed above, and the rate segments of "0-100 hours" and "100 hours above" refer to the segmentation of the resource of "accumulative Internet-access duration", wherein the charging is performed through selection of a rate according to a current value of the resource. The usage-quantity segmentation refers to segmentation of the once used quantity, such as "the first 3 minutes" as discussed above, and the rate segments of "0-3 minutes" and "3 minutes above" refers to the segmentation of the duration for this time, wherein the charging is performed according to the segmentation of the once used quantity.

Time period: IT REFERS TO A TIME INTERVAL. For example, 8:00-10:00 is a time period, and Oct. 1, 2002 to Mar. 20, 2003 is also a time period. A plurality of rate segments can be defined within a time period. The charging is performed through searching for the corresponding rate segments within the different time periods according to the initial time the subscriber uses the service.

Priority: it refers to that different time periods, rate segments and rates are combined to form different levels, each of which has a different successive relationship with another in use, and the subscriber can set the respective priorities high or low at his discretion as required. In actual applications, the process is usually performed according to the sequence from a high priority to a low priority. For example, there is a priority 0, and it includes two time periods, i.e. the time period 0 and the time period 1. The rate segments in the time period 0 are based upon the usage-quantity segmentation and include two rate segments. And also, the rate segments in the time period 1 are based upon the usage-quantity segmentation and include two rate segments. The priority can be described as follows:

Priority 0
  Time period 0: $1^{st}$-$7^{th}$ of May
    Rate segment 0: 0-3 minutes
      Rate 0: 0.2-yuan currency spent per minute
    Rate segment 1: after 3 minutes
      Rate 0: 0.1-yuan currency spent per minute
  Time period 1: other time
    Rate segment 0: 0-3 minutes
      Rate 0: 0.4-yuan currency spent per minute
    Rate segment 1: after 3 minutes
      Rate 0: 0.2-yuan currency spent per minute Charging strategy: it refers to a charging mechanism for a service comprising a combination of a plurality of priorities.

As shown in FIG. 1, the charging strategy includes a plurality of priorities each of which includes a plurality of time periods, wherein each of the time periods has a plurality of rate segments, and each of the rate segments has a plurality of rates. One charging strategy corresponds to only one service type, and charging demands for different service can be satisfied through the charging strategies with a similar structure. Therefore, the method according to the embodiments of the present invention is general.

Figure 2:
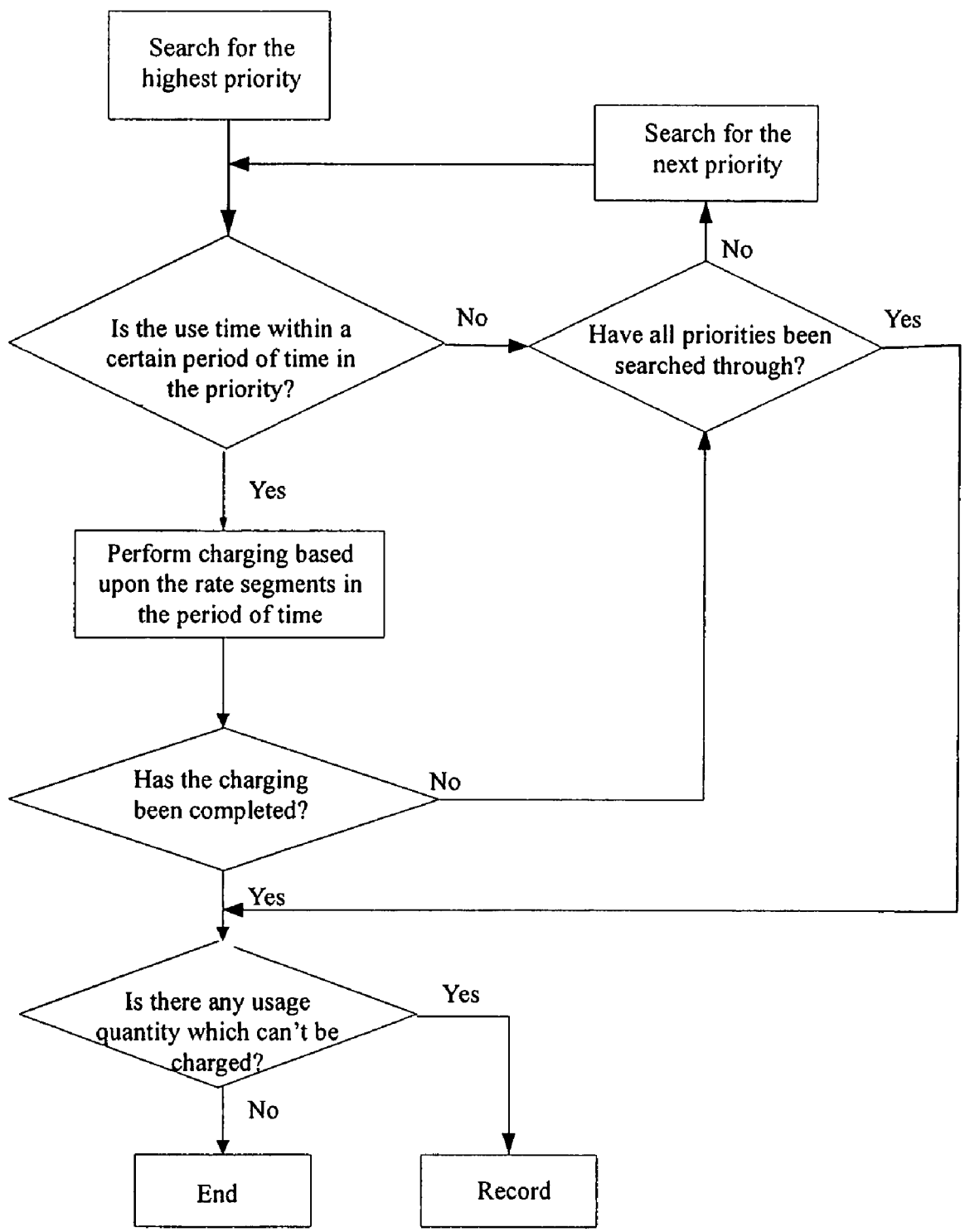
FIG. 2 is a flow diagram of the charging method according to the embodiment of the present invention.

FIG. 2 shows the flow of the charging method according to the embodiment of the present invention. First, the process searches out the highest priority in the charging strategy, and searches for time periods in this priority according to the time the subscriber starts to use the service. If the time is within a time period in this priority, the process performs the charging according to the type of rate segmentation and the rate segments in this time period; otherwise the process searches for the next priority. If the type of rate segmentation in the time period, within which the time is, is "resource-accumulative segmentation", then the charging is performed according to the resource-accumulative segmentation; and if the type of rate segmentation is "usage-quantity segmentation", then the charging is performed according to the usage-quantity segmentation. If the charging cannot be completed for this priority due to insufficient resource for the subscriber, a configuration error or the like, the process searches for the next priority and repeats the above steps, until the charging has been completed or all priorities have been searched through. If all priorities have been searched through and there are still some usage quantities that cannot be charged, the process records these usage quantities and terminates the charging for this time.

In the case of the resource-accumulative segmentation, for example, the segments for a resource r1 are a-b, b-c and c-d, whereas a current value of the resource r1 is n. The process compares the current value n of the resource r1 with a boundary value on the left and a boundary value on the right for each segment. In other words, the process judges whether it is "the boundary value on the left≦n<the boundary value on the right" or "the boundary value on the left<n≦the boundary value on the right", so as to determine which segment the "n" is in, and then performs the charging according to the rate in that segment. If the charging process makes the value of the resource r1 go beyond either boundary value of the segment, i.e. smaller than the boundary value on the left or larger than the boundary value on the right, then the boundary values are truncated, and the charging for the remaining part is continued in another segment. Finally, the sum of the charges for all respective segments is the total charge.

In the case of the usage-quantity segmentation, for example, the segments are a-b, b-c, and c-d, and the currently used quantity is n. The respectively defined segments are covered with the interval of [0, n], and all or some of the covered segment are selected. Then, the charging is performed according to the respective rates in the above segments. Finally, the sum of the charges for all the respective segments is the total charge.

The charging method will be described as follows according to embodiments of the present invention.

Embodiment 1

A charging method of the resource-accumulative with a reward, just as "later use of reward".

If the charging demand is that "1.0 yuan/hour is for the Internet-access, a reward of 10-hour free duration is for every 100-hour accumulative Internet-access, and the reward of the free duration is available for Internet-access of the next time", then the charging strategy is first established as follows:

Priority 0
  Time period 0: negative infinite (−□)-positive infinite (+□)
    Rate segment 0: 0 hour-+□
    (Usage-Quantity Segmentation)
      Rate 0: 1-hour free Internet-access duration spent per hour
Priority 1
  Time period 0: −□-+□
    Rate segment 0: 0-100 yuan
    (Resource-Accumulative Segmentation with the Resource of Accumulative Internet-Access Charge)
      Rate 0: 1.0-yuan currency spent per hour
      Rate 1: 1.0-yuan increment of the accumulative Internet-access charge per hour
    Rate segment 1: after 100 yuan
    (Resource-Accumulative Segmentation with the Resource of Accumulative Internet-Access Charge)
      Rate 0: 10-hour increment of the free Internet-access duration
      Rate 1: 100-yuan reduction of the accumulative Internet-access charge The charging process is as follows: when the subscriber accesses the Internet for the first time, the value of the resource of "accumulative Internet-access charge" is 0, and the value of the resource of "free Internet-access duration" is 0. If the current Internet-access duration of the subscriber is 150 hours, the process first searches out the priority 0 and the time period 0 according to the usage-quantity segmentation in this priority, and further searches out the rate segments and the rates in this time period. Because the value of the resource "free Internet-access duration" for the current subscriber is 0, the charging cannot be performed, and thus the process searches for the next priority. The process searches out the time period 0 according to resource-accumulative segmentation in the priority 1, and further searches out the rate segment 0 in accordance with the current value 0 of the resource "accumulative Internet-access charge" to perform the charging. When the Internet-access duration reaches 100 hours, 100-yuan currency is spent, the charge of the accumulative Internet-access counts up to 100 yuan, and thus the remaining 50 hours need to be charged in the rate segment 1. In the rate segment 1, 10 hours are added to the subscriber resource of "free Internet-access duration", and the "accumulative Internet-access charge" is reduced by 100 yuan. Because the rate segment in that time period is not related to the Internet-access duration, the remaining 50 hours have not been charged yet. In such a case, the value of "accumulative Internet-access charge" is changed to 0, and the process goes on the charging in the rate segment 0. In the rate segment 0, the above steps will be repeated until the charging has been completed. Finally, the resultant charge is determined as 150-yuan currency, the accumulative Internet-access charge is determined as 50 yuan, and the free Internet-access duration is determined as 10 hours.

When the subscriber accesses the Internet for the second time and the Internet-access duration is 30 hours, then the charging will be first performed in the priority 0. Because the value of the resource "free Internet-access duration" for the current subscriber is 10, only 10 hours will count in that priority, and the remaining 20 hours will be charged in the next priority. The charging process in the priority 1 is similar to the charging process described above. Therefore, the resultant charge is that 20-yuan currency is spent, 10-hour free Internet-access duration is spent, and the accumulative Internet-access charge is increased by 20 yuan to become 70 yuan.

Embodiment 2

A charging method of the resource-accumulative with a reward, just as "instant use of reward".

If the charging demand is that "1.0 yuan/hour is for the Internet-access, a reward of 10-hour free duration is for every 100-hour accumulative Internet-access, and the reward of the free duration is available right now, the reward of the free duration cannot be accumulated into the resource-accumulative for the reward. Then the charging strategy is first established as follows:

Priority 0
  Time period 0: negative infinite (−☐)-positive infinite (+☐)
    Rate segment 0: 0 hour-+☐
    (Usage-Quantity Segmentation with the Resource of Free Internet-Access Duration)
      Rate 0: 1-hour free Internet-access duration spent per hour
Priority 1
  Time period 0: −☐-+☐
    Rate segment 0: after 0 hour-+☐
    (Usage-Quantity Segmentation with the Resource of Free Internet-Access Duration)
      Rate 0: 1.0-yuan of free Internet-access duration spent per hour
  Time period 1: −☐-+☐
    Rate segment 0: no less than 0 hour-+☐
    (Resource-Accumulative Segmentation with the Resource of Accumulative Internet-Access Charge)
      Rate 0: 1.0-yuan currency spent per hour
      Rate 1: 1.0-yuan increment of the accumulative Internet-access charge
    Rate segment 1: equal to 100-yuan
    (Resource-Accumulative Segmentation with the Resource of Accumulative Internet-Access Charge)
      Rate 0: 10-hour increment of the free Internet-access duration
      Rate 1: 100-yuan reduction of the accumulative Internet-access charge The charging process is as follows: when the subscriber accesses the Internet for the first time, the value of the resource of "accumulative Internet-access charge" is 0, and the value of the resource of "free Internet-access duration" is 0. If the current Internet-access duration of the subscriber is 210 hours, the process first searches out the priority 0 and the time period 0 according to usage-quantity segmentation in this priority, and further searches out the rate segments and the rates in this time period. Because the value of the resource "free Internet-access duration" for the current subscriber is 0, the charging cannot be performed, and thus the process searches for the next priority. The process searches out the time period 0 according to the resource-accumulative segmentation in the priority 1, but the value of the resource of "free Internet-access duration" is 0, the charging cannot be performed, and search out the time period 1 of the priority 1, and the time period 1 according to resource-accumulative segmentation in the priority 1, further searches out the rate segment 0 in accordance with the current value 0 of the resource "accumulative Internet-access charge" to perform the charging. When the Internet-access duration reaches 100 hours, 100-yuan currency is spent, the charge of the accumulative Internet-access counts up to 100 yuan, and thus the remaining 110 hours need to be charged in the rate segment 1. In the rate segment 1, 10 hours are added to the subscriber resource of "free Internet-access duration", and the "accumulative Internet-access charge" is reduced by 100 yuan. Because the current value of the resource of "free Internet-access duration" is 10 hours, the charging will be performed in the rate segment 0 of the priority 1 and the reward of 10 hours will be consumed gradually. When the subscriber resource of "free Internet-access duration" is 0, the remaining 100 hours have not been charged yet. Because the subscriber resource of "accumulative Internet-access charge" is 0, the charging will be performed in the rate segment 1 of the time period 1 of the priority 1; in such a case, the value of "accumulative Internet-access charge" is changed to 0, and the process goes on the charging in the rate segment 1. In the rate segment 1, the above steps will be repeated until the charging has been completed. Finally, the resultant charge is determined as 200-yuan currency, the accumulative Internet-access charge is determined as 0 yuan, and the free Internet-access duration is determined as 10 hours.

When the subscriber accesses the Internet for the second time and the Internet-access duration is 150 hours, then the charging will be first performed in the priority 0. Because the value of the resource "free Internet-access duration" for the current subscriber is 10, only 10 hours will count in that priority, and the remaining 140 hours will be charged in the next priority. The charging process in the priority 1 is similar to the charging process described above. Therefore, the resultant charge is that 130-yuan currency is spent, 20-hour free Internet-access duration is spent, and the accumulative Internet-access charge is 30 yuan, and the free Internet-access duration is determined as 0 hours.

It shall be appreciated that the above embodiment is merely illustrative of but not limitative to the technical solutions of the present invention. Although the present invention has been detailed with reference to the preferred embodiments, those skilled in the art shall understand that various modifications and the equivalents will be made without departing from the spirit and scope of the technical solutions, and will be covered by the appended claims of the present invention.

The invention claimed is:

1. A general charging method comprising establishing a charging strategy and performing the charging according to the charging strategy, wherein:
   the charging strategy comprises at least one priority each of which comprises at least one time period, and each of the at least one time period is provided with at least one rate segment in each of which there is at least one rate, wherein different time periods, rate segments and rates are combined to form different levels of priorities, each of which is set high or low as required; and
   performing the charging comprises:
   matching with a corresponding charging strategy upon the time a subscriber uses a service and/or the subscriber's current resource;
   searching for a corresponding priority to determine a charging mode; and
   performing the charging according to the charging mode.

2. The charging method of claim 1, wherein searching for a corresponding priority comprises: searching for the corresponding time period from the highest priority of the charging strategy to the lowest priority of the charging strategy.

3. The charging method of claim 1, further comprising: judging whether there is any usage quantity that cannot be charged after a charging is performed; if yes, recording it and terminating the charging; otherwise, terminating the charging.

4. The charging method of claim 1, wherein the rate segment of the charging strategy corresponds to a type of rate segmentation.

5. The charging method of claim 2, further comprising: judging whether there is any usage quantity that cannot be charged after a charging is performed; if yes, recording it and terminating the charging otherwise, terminating the charging.

6. The charging method of claim 2, wherein the time period of the charging strategy corresponds to a type of rate segmentation.

7. The charging method of claim 4, wherein the rate segmentation comprises resource-accumulative segmentation type and usage-quantity segmentation type;
   the resource-accumulative segmentation type refers to segmentation of a certain resource, wherein the charging is performed through selection of a rate according to a current value of the resource; and the usage-quantity segmentation type refers to segmentation of the usage quantity, wherein the charging is performed through selection of a rate according to the once used quantity.

8. The charging method of claim 6, wherein the rate segmentation comprises resource-accumulative segmentation type and usage-quantity segmentation type;

the resource-accumulative segmentation type refers to segmentation of a certain resource, wherein the charging is performed through selection of a rate according to a current value of the resource; and the usage-quantity segmentation type refers to segmentation of the usage quantity, wherein the charging is performed through selection of a rate according to the once used quantity.

9. The charging method of claim 7, wherein the charging according to the rate segments further comprises:

performing the charging according to the resource-accumulative segmentation if the type of the rate segmentation in the time period, within which the time is, is the resource-accumulative segmentation;

performing the charging according to the usage-quantity segmentation if the type of the rate segmentation is the usage-quantity segmentation; and keeping on searching for the next priority if the charging cannot be completed in one priority due to insufficient resource for the subscriber or a configuration error.

10. The charging method of claim 8, wherein the charging according to the rate segments further comprises:

performing the charging according to the resource-accumulative segmentation if the type the rate segmentation in the time period, within which the time is, is the resource-accumulative segmentation;

performing the charging according to the usage-quantity segmentation if the type of the rate segmentation is the usage-quantity segmentation; and keeping on searching for the next priority it the changing cannot be completed in one priority due to insufficient resource for the subscriber or a configuration error.

11. The charging method of claim 9, wherein the charging process according to resource-accumulative segmentation comprises:

comparing a current value of the resource with a boundary value on the left and a boundary value on the right for each of the rate segments, i.e. judging whether the current value of the resource is not smaller than the boundary value on the left of the segment and smaller than the boundary value on the right of the segment or the current value of the resource is larger than the boundary value on the left of the segment and not larger than the boundary value on the right of the segment;

determining which one of the rate segments the current value of the resource is within;

performing the charging according to the rates in the segment;

if the charging process makes the value of the resource go beyond either boundary of the segment, i.e. smaller than the boundary value on the left or larger than the boundary value on the right, truncating the boundary value, and going on the charging for the remaining value of the resource in another segment; and taking the sum of the charges of all the respective segments as a total charge.

12. The charging method of claim 10, wherein the charging process according to resource-accumulative segmentation comprises:

comparing a current value of the resource with a boundary value on the left and a boundary value on the right for each of the rate segments, i.e. judging whether the current value of the resource is not smaller than the boundary value on the left of the segment and smaller than the boundary value on the right of the segment or the current value of the resource is larger than the boundary value on the left of the segment and not larger than the boundary value on the right of the segment;

determining which one of the rate segments the current value of the resource is within;

performing the charging according to the rates in the segment;

if the charging process makes the value of the resource go beyond either boundary of the segment, i.e. smaller than the boundary value on the left or larger than the boundary value on the right, truncating the boundary value, and going on the charging for the remaining value of the resource in another segment; and taking the sum of the charges of all the respective segments as a total charge.

13. The charging method of claim 9, wherein the charging process according to usage-quantity segmentation comprises:

covering the respective rate segments according to a value of the usage quantity;

selecting segments which are entirely or partially covered;

performing the charging according to the respective rates in the rate segments; and taking the sum of the charges of all the respective segments as a total charge.

14. The charging method of claim 10, wherein the charging process according to usage-quantity segmentation comprises:

covering the respective rate segments according to a value of the usage quantity;

selecting segments which are entirely or partially covered;

performing the charging according to the respective rates in the rate segments; and taking the sum of the charges of all the respective segments as a total charge.

* * * * *